United States Patent
Zhang

(10) Patent No.: US 12,376,187 B2
(45) Date of Patent: Jul. 29, 2025

(54) POWER SAVING METHOD WITH REGARD TO NR-V2X GROUPCAST COMMUNICATION

(71) Applicant: Bo Zhang, Shanghai (CN)

(72) Inventor: Bo Zhang, Shanghai (CN)

(73) Assignee: Bo Zhang, Shanghai (CN)

( * ) Notice: Subject to any disclaimer, the term of this patent is extended or adjusted under 35 U.S.C. 154(b) by 527 days.

(21) Appl. No.: 17/822,292

(22) PCT Filed: Feb. 25, 2020

(86) PCT No.: PCT/CN2020/076607
§ 371 (c)(1),
(2) Date: Aug. 25, 2022

(87) PCT Pub. No.: WO2021/168653
PCT Pub. Date: Sep. 2, 2021

(65) Prior Publication Data
US 2023/0276525 A1  Aug. 31, 2023

(51) Int. Cl.
*H04W 76/28*  (2018.01)
*H04W 72/02*  (2009.01)

(52) U.S. Cl.
CPC ........... *H04W 76/28* (2018.02); *H04W 72/02* (2013.01)

(58) Field of Classification Search
CPC . H04W 76/28; H04W 72/02; H04W 52/0216; H04W 92/18; Y02D 30/70
See application file for complete search history.

(56) References Cited

U.S. PATENT DOCUMENTS

| | | | |
|---|---|---|---|
| 2022/0039149 A1* | 2/2022 | Chen | H04W 72/12 |
| 2022/0232660 A1* | 7/2022 | Back | H04W 76/28 |
| 2022/0394699 A1* | 12/2022 | Lee | H04W 4/44 |
| 2023/0063472 A1* | 3/2023 | Freda | H04W 52/0274 |
| 2024/0015830 A1* | 1/2024 | Hong | H04W 4/08 |

FOREIGN PATENT DOCUMENTS

| | | |
|---|---|---|
| CN | 101464722 A | 6/2009 |
| CN | 108886767 A | 11/2018 |
| CN | 110169159 A | 8/2019 |
| WO | 2019066629 A1 | 4/2019 |

OTHER PUBLICATIONS

Zugno et al, "Toward Standardization of Millimeter-Wave Vehicle-to-Vehicle Networks: Open Challenges and Performance Evaluation", IEEE, 2020 (Year: 2020).*

(Continued)

*Primary Examiner* — Omer S Mian
(74) *Attorney, Agent, or Firm* — Hsuanyeh Law Group, PC

(57) ABSTRACT

The present application provides a power saving method with regard to NR-V2X groupcast communication. In the present invention, a destination L2 ID (destination L2 ID) is taken as control parameters, and all group members take the destination L2 ID as reference points, and DRX cycles and active intervals of UEs are statically or dynamically controlled, so that a power saving effect is achieved. Mechanisms in the present invention may guarantee the overall performance in the aspects of power saving, reliability and latency.

16 Claims, 5 Drawing Sheets

(56) References Cited

OTHER PUBLICATIONS

Liu et al, "Improving IoT Device Power Efficiency: Discontinuous Reception for Mixed Traffic in Mulitcast and Broadcast Services", IEEE, 2024 (Year: 2024).*
Shrivastava, et al, "Sidelink Evolution toward 5G-A/6G Future Considerations for Standardization of Group Communications", IEEE, 2023 (Year: 2023).*
Spreadtrum Communications, "Discussion on Resource Sensing and Selection for Pedestrian UEs" 3GPP TSG RAN WGI Meeting #86 RI-166993. Aug. 26, 2016 (Aug. 26, 2016).

* cited by examiner

POWER SAVING METHOD WITH REGARD TO NR-V2X GROUPCAST COMMUNICATION

TECHNICAL FIELD

The present application relates to a communication method, and particularly relates to a power saving method with regard to NR-V2X groupcast communication.

BACKGROUND

In the communication field, there are two electric power management modes currently, one is an idle mode and the other is a discontinuous reception (DRX) mode.

When user equipments (UEs) enter the idle mode, although a network can still monitor the UEs through a paging procedure, the UEs are not actively connected to a base station (for example, a 4G base station eNB) any more; and in the idle mode, the UEs are allowed to be kept in a mode with very low power consumption, because the UEs only need to execute very limited functions in that mode.

In the DRX mode, the UEs may save power consumption by being allowed to cut off a power supply at predetermined time intervals according to instructions of the eNB. The DRX provides significant benefits in the aspects of resource utilization and power saving, but requires a trade-off between power saving and data transmission latency. Therefore, in order to balance battery saving and the data transmission latency, long term evolution (LTE) supports the concepts of short DRX and long DRX, and allows each UE to be configured with two DRX cycles, namely, a short DRX cycle and a long DRX cycle. The UE is activated to receive and send data packet, in a period in the cycle.

In long term evolution vehicle-to-everything (LTE-V2X), although the DRX cycles are still involved, the power-saving mechanism is quite unique. In a Uu link, for the purpose of battery saving, the UEs do not receive downlink channels in a DRX period. However, in sidelinks, sensing must be carried out before V2X communication, so that random resource selection conflicts are reduced, and then the packet reception ratio (PRR) performance is improved. For the purpose, a partial sensing mechanism is introduced into the LTE-V2X, and that mechanism allows the UEs to carry out sensing operation in a specific sensing window within a limited time. By virtue of the partial sensing mechanism, each UE is configured or pre-configured (that is, (pre-)configured) with specific UE parameters related to sensing. For example, if partial sensing is configured for pedestrian UEs, in a sensing window (for example, 1000 subframes), before executing the partial sensing, the UEs need to obtain two parameters: one parameter is used for indicating the minimum number (expressed to be minNumCandidateSF) of the subframes contained in possible candidate resources, and the other parameter is used for indicating the sensing subframes (expressed to be gap Candidate Sensing) when some subframes are regarded as candidate resources.

In the traditional LTE-V2X, the sensing and resource selection processes are designed with regard to a periodic packet broadcast service, the sensing and reception are executed in a manner of periodic triggering, moreover, the DRX is effectively configured in the K DRX cycles in the sensing window, and a periodic triggering manner or an event triggering manner is utilized for a transmission process according to a service type. Once sensing in the subframes, the UEs may not need to decode packets in physical sidelink shared channels (PSSCHs), however, once decoding the packets in the PSSCHs, the UEs must pre-sense or pre-decode sidelink control information (SCI) in the physical sidelink control channels (PSCCHs) in the subframes. That is, the UEs may execute reception and transmission only in the sensing mode. Whether the UEs enter the sensing mode and execute the sensing process in the $k^{th}$ DRX cycle or not depends on a (pre-) configured sequence pattern $q_K=\{q_1, q_2, \ldots, q_K\}$. It means that if $q_k=1$, the UEs should execute the sensing precess in the $k^{th}$ DRX cycle, otherwise the UEs should be kept in the sleep mode. The partial sensing mechanism may be well applied to broadcast and unicast.

FIG. 1 describes the procedures of the partial sensing of the LTE-V2X in detail, where a sensing subset is (pre-) configured with regard to the UEs to be activated, the UE sensing intervals X are equal to 5, the number K of the DRX cycles is equal to 10, and the DRX cycles are effectively formulated by using a sequence pattern $q_K=\{1100100001\}$. However, the partial sensing mechanism is only applicable to broadcast communication with a periodic packet traffic.

New radio vehicle-to-everything (NR-V2X) has very wide application fields, and supports more than 30 use cases, including unicast communication, groupcast communication and broadcast communication. With regard to such complex application fields, the biggest challenge to realize power saving is how to balance groupcast performance and power consumption. It is generally believed that a single DRX parameter set is not sufficient to meet different communication types of services, for example, in the main use case of groupcast, there are vehicle platooning, automated cooperative driving, sensor sharing, remote driving and the like; and the vehicle platooning, automated cooperative driving, sensor sharing, remote driving and the like have different performance requirements, such as reliability (for example, packet reception ratio (PRR)), coverage range (for example, communication range), and latency. Therefore, when power saving of the groupcast is realized, the biggest challenge is to guarantee that all group members sense channels in the same transmit slots, and receive and send data packet.

Because the conditions of use cases in the NR-V2X are more complex, especially with regard to the groupcast communication, the power-saving mechanism of the traditional LTE-V2X will not be effectively used. In the groupcast communication, when the groupcast members UEs randomly sleep and wake up in the DRX cycles, there is a problem that part of the members UEs cannot communicate with each other, which seriously reduces the PRR performance. There are two types of the groupcasts: the first is a groupcast based on a communication range, and the groupcast is composed of the UEs located in the communication range; and the second is a groupcast composed of all groupcast members with the same dedicated destination L2 ID which is determined by a high layer and indicated to each groupcast member in advance.

FIG. 2 shows the worst case of the partial sensing in the groupcast, five receive UEs (Rx UEs) randomly sleep and are woken up in the DRX cycles (for example, 100 ms) and cannot receive packets transmitted from transmit UE (Tx UE), and therefore, the PRR is zero. If the groupcast UEs are forced to sleep and wake up at the same time, although all the groupcast UEs can receive the packets, optional resources used by the different groupcast UEs for transmission are limited, so that the problem of resource conflicts among the Tx UEs occurs.

SUMMARY

With regard to the problems existing in the prior art, the present application provides a power saving method with regard to NR-V2X groupcast communication.

In the present application, a power saving method with regard to NR-V2X groupcast communication is provided, the groupcast is realized on the basis of the dedicated destination L2 ID determined by the high layer, different groupcasts have different destination L2 IDs, and all the UEs in the $j^{th}$ groupcast know the dedicated destination L2 ID associated with groupcast service in advance and mark the dedicated destination L2 ID as $ID_j$, where j=0, 1, ..., J−1, and J is the maximum number of the groupcasts allowed by the groupcast service.

Preferably, the member UEs in the $j^{th}$ groupcast are activated in the $n_{k,j}{}^{th}$ slot of the $k^{th}$ DRX cycle, $n_{k,j}$ may be expressed to be $$n_{k,j}=(ID_j+\Delta_k) \bmod N_k,$$

where $N_k$ is the number of the slots in the $k^{th}$ DRX cycle, that is, $N_k$ is the cycle length, and $\Delta_k$ is set to be a mapping offset in the $k^{th}$ DRX cycle, $0 \leq \Delta_k < N_k$, k=1, 2, ..., K, K is a number of the DRX cycle.

It should be understand that $n_{k,j}$ can be seemed as a DRX Start Offset.

Preferably, the member UEs in the $j^{th}$ groupcast are activated in the $n_{k,j}{}^{th}$ resource pool of the $k^{th}$ DRX cycle, $n_{k,j}$ may be expressed to be $$r_{k,j}=(ID_j+\Delta_k') \bmod N_R,$$

where $N_R$ is the number of the resource pools configured or pre-configured for the UEs, $\Delta_k'$ is the mapping offset in the $k^{th}$ DRX cycle, and $0 \leq \Delta_k' < N_R$.

Preferably, all the UEs associated with the $j^{th}$ groupcast sense in the $2Y_{k,j}+1$ slots in the $k^{th}$ DRX cycle.

More preferably, the UE sensing intervals of each groupcast are kept to be basically constant, and $Y_{k,j}$ is simplified to be $Y_j$.

In a preferred embodiment, in a manner of contiguous slot sensing, the sensing state $S_{k,j}(n)$ of the $j^{th}$ groupcast service in the $n^{th}$ slot in the $k^{th}$ DRX cycle is configured or pre-configured ((pre-) configured) to be $$S_{k,j}(n) = \begin{cases} 1 & \text{if } n_{k,j}-Y_{k,j} \leq n \leq n_{k,j}+Y_{k,j} \\ 0 & \text{else} \end{cases},$$

where n=0, 1, ..., $N_k$−1, and $Y_{k,j}$ is a (pre-) configured parameter of the UE sensing intervals in the $j^{th}$ groupcast in the $k^{th}$ DRX cycle.

Preferably, $S_{k,j}(n)=1$ then the UEs associated with the $j^{th}$ groupcast which is indicated by the destination L2 ID are activated to sense in the $n^{th}$ slot of the $k^{th}$ DRX cycle, otherwise the UEs are kept in the sleep mode.

In another preferred embodiment, in a manner of distributed slot sensing, the sensing state $S_{k,j}(n_{k,j})$ of the $N_k$ slot of the $j^{th}$ groupcast service associated with the $n_{k,j}{}^{th}$ slot in the $k^{th}$ DRX cycle may be (pre-) configured to be For example, $$S_{k,j}(n_{k,j}) = \{S_{k,j}(0), S_{k,j}(1), \ldots, S_{k,j}(N_k-1),\}$$

$$S_{k,j}(n_{k,j}) = \{\underbrace{1 \cdots 0 \; \overset{n_{k,j}\text{-th element}}{\underset{\Downarrow}{1}} \; 1 \cdots 0}_{2Y_j+1 \text{ elements }=1 \text{ within } N_k \text{ slots}}\}.$$

Preferably, the $n^{th}$ element in $S_{k,j}(n_{k,j})$ is equal to 1, the UEs associated with the $j^{th}$ groupcast which is indicated by the destination L2 ID (that is, $ID_j$) are activated to sense in the $n^{th}$ slot in the $k^{th}$ DRX cycle, otherwise the UEs are kept in the sleep mode.

Preferably, the sensing state $S_k{}^U$ of the total slot in the $k^{th}$ DRX cycle may be obtained by calculating through a union set of the set $S_{k,j}(n_{k,j})$, that is $$S_k^U = \bigcup_{j=0}^{J-1} S_{k,j}(n_{k,j}).$$

Preferably, according to the destination L2 ID indicated by the high layer, the UEs may also be controlled to sense in part of the resource pools, so that the power-saving gain is achieved.

Preferably, the member UEs in the $j^{th}$ groupcast are activated in the $r_{k,j}{}^{th}$ resource pool of the $k^{th}$ DRX cycle, $r_{k,j}$ may be expressed to be $r_{k,j}=(ID_j+\Delta_k') \bmod N_R$, where $N_R$ is the number of the resource pools (pre-)configured for the UEs, $\Delta_k$ is the mapping offset in the $k^{th}$ DRX cycle, and $0 \leq \Delta_k < N_R$.

Preferably, the resource pools are defined to be subsets of available slots and frequency resource blocks for sidelink transmission or reception. The resource pools in a time domain are indicated by bit mapping and are repeated at certain intervals. The repetition time intervals of the resource pools may be assumed to be the same as the DRX cycles, or the repetition time intervals of the resource pools and the DRX cycles are integral multiples of each other.

More preferably, all the UEs associated with the groupcast may carry out more efficient power-saving sensing in the different DRX cycles by combining the associated parameters of the slots and the resource pools.

In the present invention, a destination L2 ID are taken as control parameters, and all group members take the Zone-ID and the destination ID as reference points, and DRX cycles and active intervals of UEs are statically or dynamically controlled, so that an power saving gain is achieved. Mechanisms in the present invention may guarantee the overall performance in the aspects of power saving, reliability and latency. The Mechanisms of the present for power saving is also effective for broadcast and unicast.

DETAILED DESCRIPTION OF THE EMBODIMENTS

Figure 1:
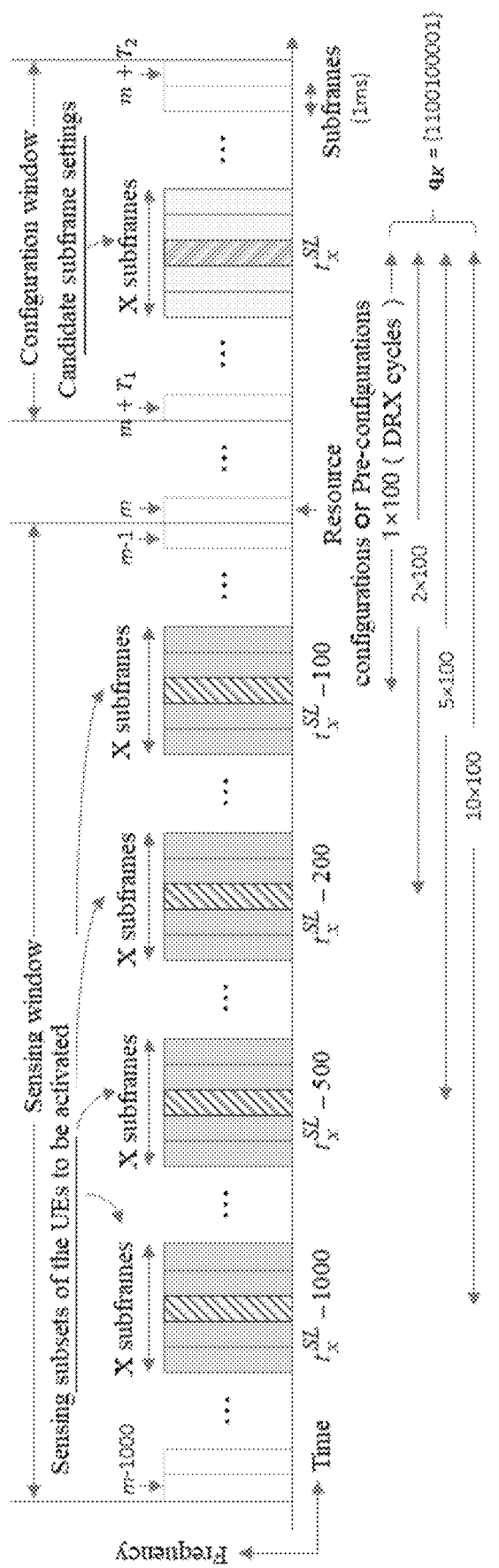
FIG. 1 shows an example of procedures of partial sensing of LTE-V2X, where Y is equal to 5, K is equal to 10, and AK is equal to {1100100001}.
Figure 2:
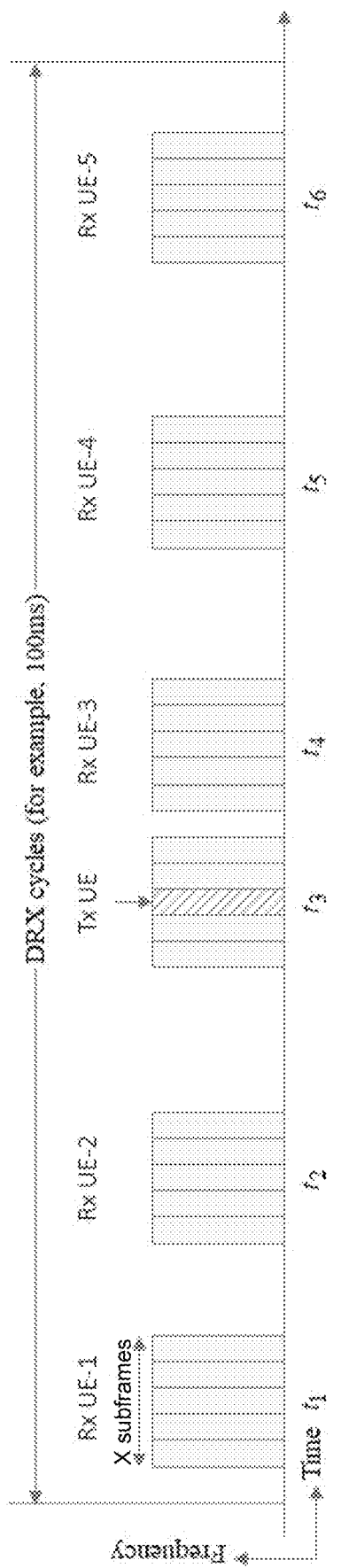
FIG. 2 shows an example of partial sensing with regard to random sleep and wake-up in groupcast communication.

It is generally known that there are two types of groupcasts: the first is groupcast based on a communication range, which is composed of UE within the communication range;

and the second is groupcast composed of all groupcast members with the same dedicated destination L2 ID, and the dedicated destination L2 ID is determined by a high layer and indicated to each groupcast member in advance.

In the first type of groupcast, the Tx UE transmits the own position and the communication range related to packets. All the Rx UEs compare the communication ranges by calculating distances from the Tx UE, and then judge whether the Tx UE is the groupcast member or not. In the second type of groupcast, an application layer determines the destination L2 ID, and the destination L2 ID is indicated to the a 3GPP layer in advance, and notified to each groupcast member. Once the groupcast packets are transmitted, the high layer transfers the destination L2 ID and the packets to an MAC layer, and the Tx UE transmits the destination L2 ID and the packets to all the UEs. Then, the Rx UEs compare the pre-owned destination L2 ID with the destination L2 ID received with the packets, and if the pre-owned destination L2 ID and the destination L2ID received are consistent, the packets are the packets of the groupcast belonging to the destination L2 ID.

Generally, with regard to specific services, the V2X UEs are allowed to support connection of a plurality of unicasts or connection of a plurality of groupcast groups at the same time. Therefore, the destination L2 IDs of different groupcasts are different; the destination L2 IDs of some groupcasts may be generated in an access stratum (AS) layer, while the destination L2 IDs of some groupcasts may come from an upper layer (for example, the V2X application layer).

The different types of groupcasts need different sidelink control information (SCI). With regard to the groupcast based on the communication range, the Tx UE needs to transfer the position information and the communication range in the SCI, so that each Rx UE judges whether the Rx UE belongs to the groupcast range or not through the positions of the Tx UE and the Rx UE. With regard to the groupcast based on the destination L2 ID, the Tx UE needs to transmit the destination L2 ID associated with the groupcast in the SCI, so that each Rx UE may judge whether the Tx UE belongs to the groupcast range or not. Once the Rx UEs judge that the Tx UE belongs to the groupcast range (with regard to any type of the groupcast), the Rx UEs start an HARQ process and decide whether to feed back acknowledgement (ACK) or negative acknowledgement (NACK) or not.

With regard to the groupcast based on the destination L2 ID, in the present application, parameters related to the destination L2 ID are introduced to achieve the purpose of power saving for power consumption.

Embodiment 1

If the value of the mapping offset $\Delta_k$ is fixed in the different DRX cycles, the conflict probability of the selected resources among the Tx UEs may be increased. This is because the resource candidates selected by the UEs at the same sensing interval and receiving/sending interval are the same in the time domain and frequency domain, so that the freedom of resource selection is reduced and the overall performance of the NR-V2X is influenced.

Here, in the embodiment, different mapping offset values $\Delta_k$ are configured in the DRX cycles, so that the conflict probability of the resources selected by the UEs is reduced.

In order to reduce the possibility of resource conflicts, in the embodiment, the (pre-) configured sequence pattern $\Delta_K = \{\Delta_1, \Delta_2, \ldots, \Delta_K\}$ is considered, and the mapping offset value $\Delta_k$ is changed in the different DRX cycles.

Figure 3:
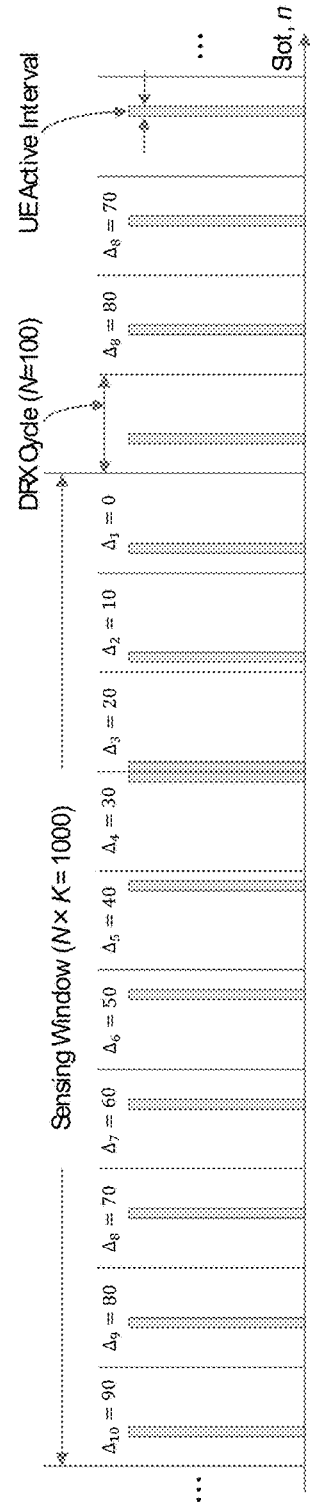
FIG. 3 shows an example of dynamic mapping offset $\Delta_k$.

FIG. 3 illustrates the dynamic mapping offset in the sensing window, with configurable parameters N=100, K=10, and the configured sequence pattern $\Delta_K = \{0, 10, \ldots, 90\}$ K is the number of DRX cycles.

Embodiment 2

The groupcast service may be realized on the basis of the dedicated destination L2 ID determined by the high layer; that is, different groupcasts have different destination L2 IDs. Therefore, power saving based on the DRX can also effectively rely on destination L2 ID information. By obtaining the least significant bit (LSB) of the destination L2 ID, each UE may determine the UE activating and sensing intervals on the basis of the (pre-) configured values in the DRX cycles.

It is assumed that all the UEs in the $j^{th}$ groupcast know the dedicated destination L2 ID associated with the groupcast service in advance and mark the dedicated destination L2 ID as $ID_j$, where j=0, 1, ..., J−1, and J is the maximum number of the groupcasts allowed by the groupcast service. This is because the NR-V2X allows the UEs to support a plurality of the groupcast services at the same time. Therefore, according to the indication of the destination ID (that is, $ID_j$), the member UEs in the $j^{th}$ groupcast should be activated and receive/send data packet in the $n_{k,j}^{th}$ slot of the $k^{th}$ DRX cycle. $n_{k,j}$ may be expressed to be $$n_{k,j} = (ID_j + \Delta_k) \bmod N_k,$$

where $N_k$ is the length of the $k^{th}$ DRX cycle in the slots, and $\Delta_k$ is the mapping offset (generally an integer) in the $k^{th}$ DRX cycle, and mainly plays the role of pseudo randomization, $0 \leq \Delta_k < N_k$, k=1, 2, ..., K, K is the number of the DRX cycle. Refer to the embodiment 1 for the mapping offset.

It should be understood that $n_{k,j}$ can be seemed to be a DRX Start Offset.

Embodiment 3

With regard to the UEs for transmission and reception, only the single slots in the DRX cycles need to be indicated. However, for the purposes of sensing and resource selection, a plurality of the slots are needed, so that enough resources are guaranteed to be obtained in a candidate slot set. Therefore, in this case, all the UEs associated with the $j^{th}$ groupcast need to sense in the $2Y_{k,j}+1$ slots in the $k^{th}$ DRX cycle. Because the services in each groupcast are generally similar, the UE sensing intervals of each groupcast may be kept to be basically constant. That is to say, the parameter $Y_{k,j}$ may be simplified to be $Y_j$.

In addition, the sensing slots may be (pre-) configured on the basis of a manner of contiguous slot sensing or a manner of distributed slot sensing. If in the manner of contiguous slot sensing, for example, the sensing state $S_{k,j}(n)$ of the $j^{th}$ groupcast service in the $n^{th}$ slot of the $k^{th}$ DRX cycle is (pre-) configured to be $$S_{k,j}(n) = \begin{cases} 1 & \text{if } n_{k,j} - Y_{k,j} \leq n \leq n_{k,j} + Y_{k,j} \\ 0 & \text{else} \end{cases},$$

where n=0, 1, ..., $N_k$−1, and $Y_{k,j}$ is a (pre-) configured parameter of the UE sensing intervals in the $j^{th}$ groupcast in the $k^{th}$ DRX cycle.

It should be noted that, if $S_{k,j}(n)=1$, then the UEs associated with the $j^{th}$ groupcast which is indicated by the destination L2 ID should be activated to sense in the $n^{th}$ slot in the $k^{th}$ DRX cycle, otherwise the UEs should be kept in the sleep mode. In each DRX cycle, the sensing slots of each UE among the different groupcasts may be overlapped, which contributes to reducing the whole UE sensing intervals in the DRX cycles, without an influence on the overall performance.

As an example, it is assumed that the UE intervals are only based on the groupcast service and are independent of the index of the DRX cycles. Therefore, if the configurable parameters N=16, K=3, J=2, $\Delta_k$=0, {$ID_0$ $ID_1$}={43 20} and {$Y_0$ $Y_1$}={1 2} are given, according to the value of $ID_j$, $n_{k,j}$ can be derived $$\begin{cases} n_{k,0} = (ID_0 + \Delta_k) \bmod 16 = 11 \\ n_{k,1} = (ID_1 + \Delta_k) \bmod 16 = 4 \end{cases}.$$

Figure 4:
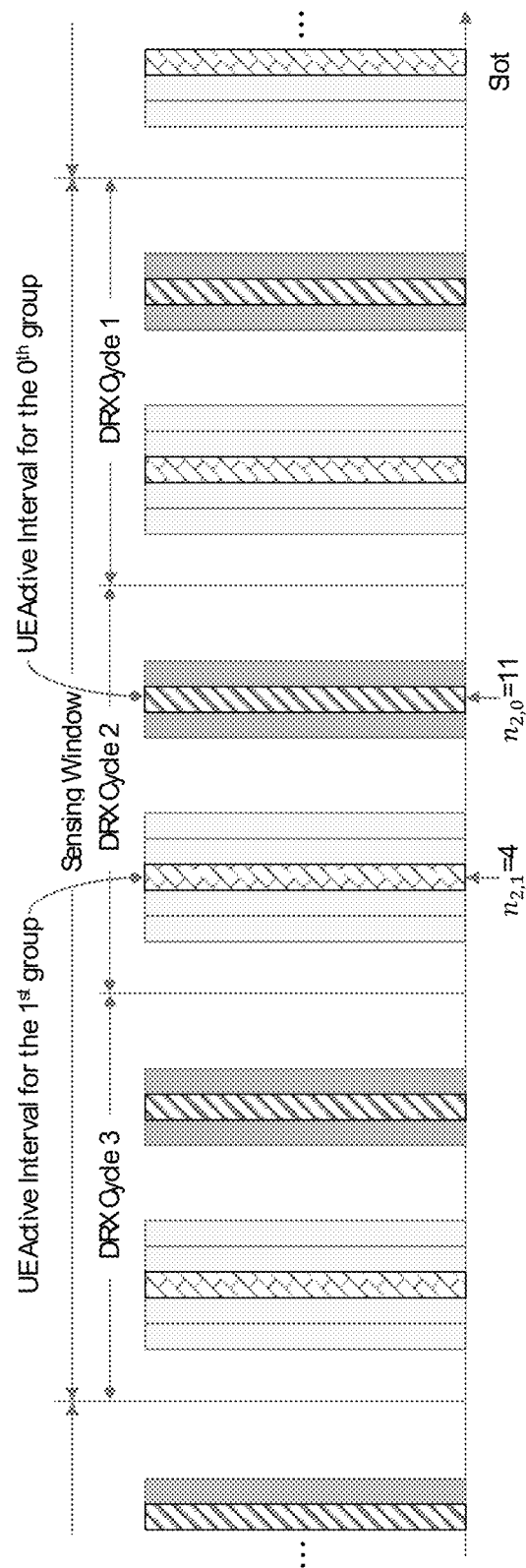
FIG. 4 shows a manner of partial contiguous slot sensing based on destination L2 ID.

Through these configuration parameters and the derived value, FIG. 4 illustrates a manner of partial contiguous slot sensing based on the destination L2 ID.

If in the manner of distributed slot sensing, for example, the sensing state $S_{k,j}(n_{k,j})$ of the $N_k$ slot of the $j^{th}$ groupcast service associated with the $n_{k,j}^{th}$ slot in the $k^{th}$ DRX cycle may be (pre-) configured to be $$S_{k,j}(n_{k,j})=\{S_{k,j}(0),S_{k,j}(1),\ldots,S_{k,j}(N_k-1),\}$$

For example:

$$S_{k,j}(n_{k,j}) = \left\{ \underbrace{1 \ldots 0 \overset{\overset{n_{k,j}\text{-th element}}{\Downarrow}}{1} \quad 1 \ldots 0}_{2Y_j+1 \text{ elements}=1 \text{ within } N_k \text{ slots}} \right\}.$$

It should be noted that, if the $n^{th}$ element $S_{k,j}(n)$ in $S_{k,j}(n_{k,j})$ is equal to 1, the UEs associated with the $j^{th}$ groupcast which is indicated by the destination L2 ID (that is, $ID_j$) should be activated to sense in the $n^{th}$ slot in the $k^{th}$ DRX cycle, otherwise the UEs should be kept in the sleep mode. Therefore, the total slot expressed by $S_k^U$ may be obtained by calculating through a union set of the set $S_{k,j}(n_{k,j})$ $$S_k^U = \bigcup_{j=0}^{J-1} S_{k,j}(n_{k,j}).$$

For example, it is assumed that N=16, K=3, J=2, {$ID_0$ $ID_1$}={43 20} and {$Y_0$ $Y_1$}={1 2}, $S_{k,j}(n_{k,j})$ may be (pre-) configured in a manner of bit mapping $$\begin{cases} S_{k,0}(n_{k,0}) = \left\{ \begin{array}{c} \phantom{00000000010} \overset{11th \text{ element}}{\Downarrow} \\ 00000000010 \quad 1 \quad 0100 \end{array} \right\} \\ S_{k,0}(n_{k,1}) = \left\{ \begin{array}{c} \overset{4th \text{ element}}{\Downarrow} \\ 0100 \quad 1 \quad 00100100100 \end{array} \right\} \end{cases}.$$

Because the UE sensing intervals of the two groupcasts are partially overlapped, the union of the two groupcasts may be described to be $$S_k^U=\{0100100101110100\}.$$

Figure 5:
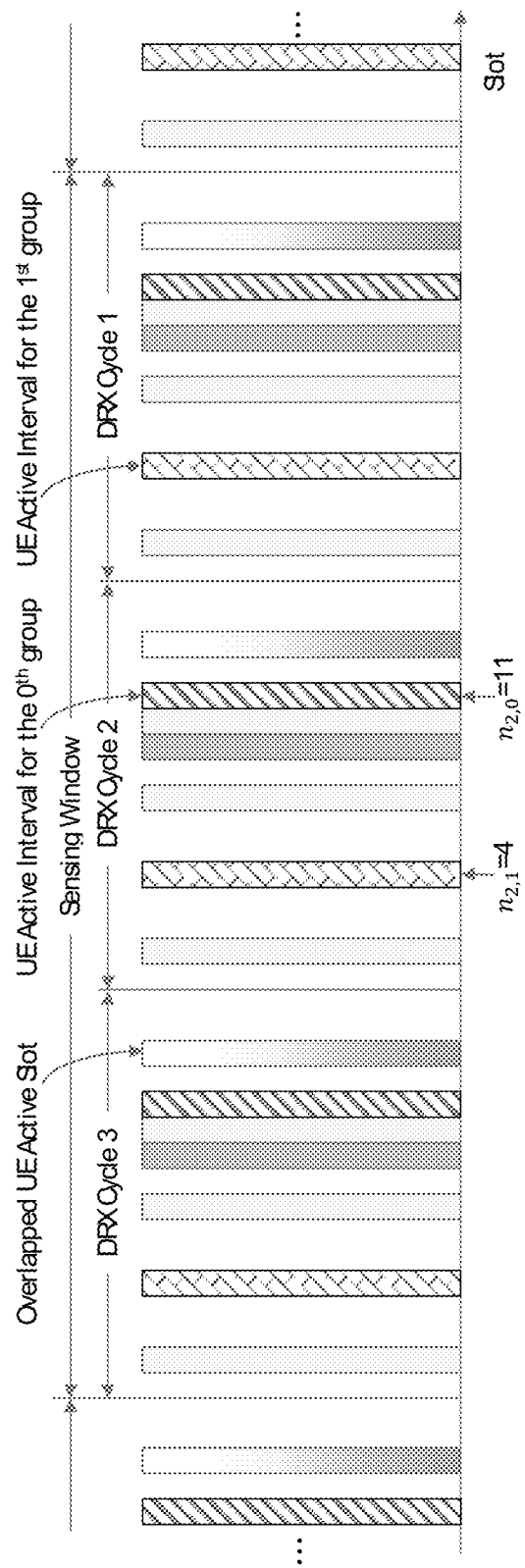
FIG. 5 shows an example of partial sensing based on destination L2 ID and in a manner of distributed slot sensing.

FIG. 5 shows an example of partial sensing based on the destination L2 ID and the manner of distributed slot sensing, where the two groupcasts jointly activate the 13th slot, so that the total number of the sensing slots may be reduced.

It is worth noting that the parameter $Y_{k,j}$ should not be set to be too large, the larger parameter $Y_{k,j}$ needs more sensing time, so that higher power consumption is caused. The appropriate $Y_{k,j}$ value depends on the priority of the groupcast services. In addition, the higher the number of the overlapped sensing slots, the better the power-saving effect. However, the overlapping of the sensing slots may reduce the freedom of resource selection in the candidate slot set and cause the resource selection conflicts among the Tx UEs.

It is assumed that each UE may join J groupcasts at most at the same time. If the UEs want to further reduce the power consumption, the number of the groupcasts sensed by the UEs needs to be limited. If UEs are limited to sense the $J_{lim}$ groupcast only, where $J_{lim} \leq J$, which groupcast the UEs join for sensing depends on the following factors:
- the priority of the groupcast services, or
- the freshness (that is, the duration of the groupcast services) of the destination L2 ID indicated from the high layer, or
- the number of transmissions related to destination L2 ID groupcast, or the above comprehensive factors.

Embodiment 4

According to the indication of the destination L2 ID (that is, $ID_j$), the member UEs in the $j^{th}$ groupcast should be activated in the $n_{k,j}^{th}$ resource pool of the $k^{th}$ DRX cycle. $n_{k,j}$ may be expressed to be $$n_{k,j}=(ID_j+\Delta_k') \bmod N_R,$$

where $N_R$ is the number of the resource pools (pre-) configured for the UEs, $\Delta_k'$ is the mapping offset in the $k^{th}$ DRX cycle, and $0 \leq \Delta_k' < N_R$ k=1, 2 ..., K, K is the number of the DRX cycle. Refer to the embodiment 3 for the mapping offset.

It should be noted that the resource pools are defined to be subsets of available slots and frequency resource blocks for sidelink transmission or reception. The resource pools in a time domain are indicated by bit mapping and are repeated at certain intervals. It may be assumed that the repetition time intervals of the resource pools are the same as the DRX cycles, or the repetition time intervals of the resource pools and the DRX cycles are integral multiples of each other.

Therefore, the Tx UE associated with the $j^{th}$ group selects the resources in the $n_{k,j}^{th}$ resource pool, and transmits the packets in the $k^{th}$ DRX cycle. Meanwhile, all the Rx UEs associated with the $j^{th}$ groupcast only need to access the $r_{k,j}^{th}$ resource pool, and Tx UEs sense in all (or part) of the slots in the $k^{th}$ DRX cycle. It should be noted that by considering the manner of sensing through part of the slots, the main role is to combine the resource pool sensing mechanism with the aforementioned partial slot sensing mechanism, so that a better power-saving effect is obtained.

As an example, the UEs only need to sense the corresponding resource pools. For simplicity, it is assumed that the repetition time intervals of the resource pools are the same as the DRX cycles, and the resource pool sensing is based on the configuration assumptions of $N_R$=3 (represented by $R_0$, $R_1$ and $R_2$ resource pools), K=3, M=2, {$\Delta_1$ $\Delta_2$ $\Delta_3$}={0 2 1} and {$ID_0$ $ID_1$}={43 20}. Here, it may be derived to give the resource pool indexes $$\begin{cases} r_{1,0} = (ID_0 + \Delta_1) \bmod 3 = 1 \\ r_{2,0} = (ID_0 + \Delta_2) \bmod 3 = 0 \\ r_{3,0} = (ID_0 + \Delta_3) \bmod 3 = 2 \end{cases} \text{ and } \begin{cases} r_{1,1} = (ID_1 + \Delta_1) \bmod 3 = 2 \\ r_{2,1} = (ID_1 + \Delta_2) \bmod 3 = 1 \\ r_{3,1} = (ID_1 + \Delta_3) \bmod 3 = 0 \end{cases},$$

Figure 6:
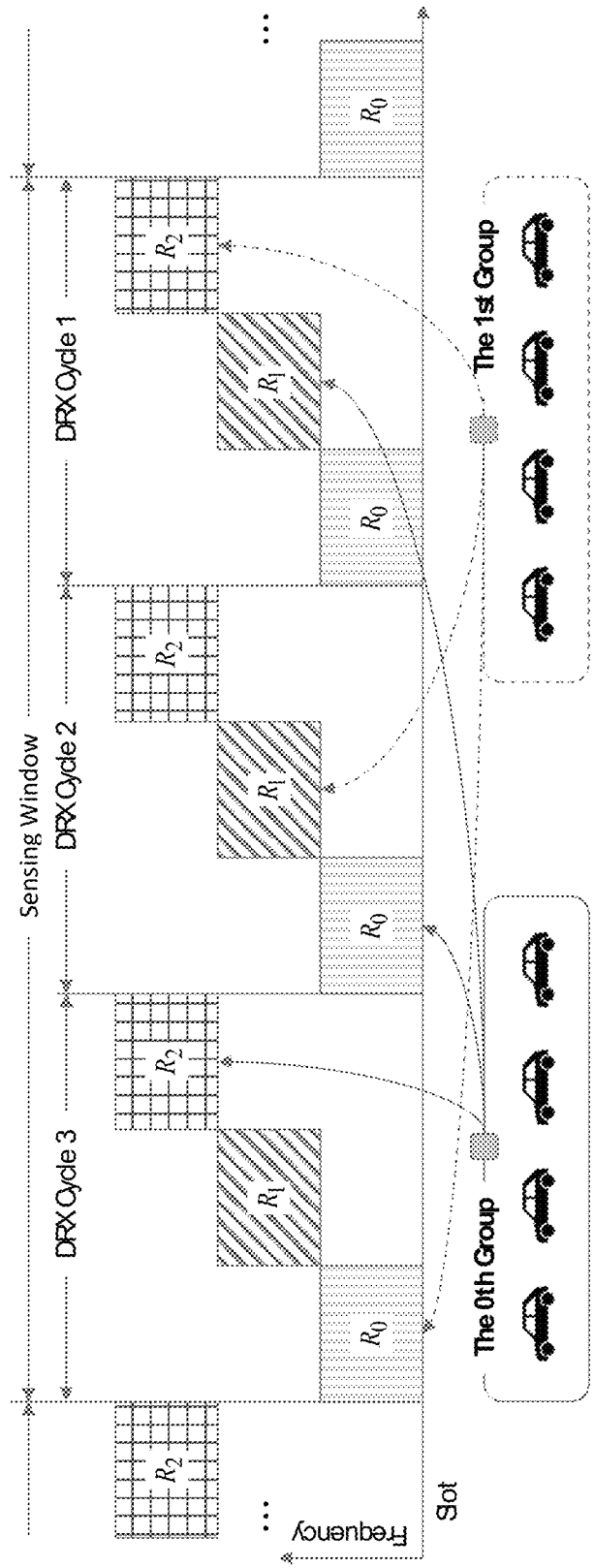
FIG. 6 shows an example of partial resource pool sensing based on destination L2 ID.

These configuration parameters and the derived resource pool indexes are used, and the resource pool sensing based on the groupcast destination L2 ID is shown in FIG. 6. Usually, the NR-V2X system allows the UEs to support a plurality of types of different services at the same time, for example, the groupcast service based on the destination ID, the groupcast service based on the communication range, and the broadcast and unicast service. Therefore, all the mechanisms proposed above may fully participate in the decision for UE activating and sensing intervals in each DRX cycle, so that the partial sensing of the NR-V2X is more effectively realized.

The specific embodiments of the present disclosure are described in details above, and used as examples only. The present disclosure is not limited to the specific embodiments described above. For the personnel skilled in the art, any equal modification and replacement to the present disclosure shall be in the scope of the present disclosure. Therefore, the equal change and modification made without deviating from the spirit and scope of the present disclosure shall be covered within the scope of the present disclosure.

What is claimed is:

1. A method for power saving in a group of sidelink communication devices and reducing resource conflicts with regard to DRX of the sidelink communication devices, the method performed at one of the sidelink communication devices and comprises:
   receiving a $j^{th}$ destination L2 ID from a higher layer;
   determining an active time, an active resource pool or an active sensing window of any DRX cycle of the sidelink communication devices is based on the $j^{th}$ destination L2 ID, the $j^{th}$ destination L2 ID being distributed to the group of sidelink communication devices by the high layer;
   wherein, for said one of the sidelink communication devices that possesses the $j^{th}$ destination L2 ID, in the $k^{th}$ DRX cycle, an $n_{k,j}^{th}$ interval is activated, and a data packet is received when said one of the sidelink communication devices is a receiving device of the group and transmitted when said one of the sidelink communication devices is a transmitting device of the group, wherein the $n_{k,j}$ is expressed to be $n_{k,j}=(ID_j+\Delta k) \bmod N_k$;

wherein for said one of the sidelink communication devices that possesses the $j^{th}$ destination L2 ID, in the $k^{th}$ DRX cycle, an $r_{k,j}^{th}$ resource pool is activated, and a data packet is received when said one of the sidelink communication device is a receiving devices of the group and transmitted when said one of the sidelink communication devices is a transmitting device of the group, wherein the $r_{k,j}$ is expressed to be $r_{k,j}=(ID_j+\Delta k') \bmod M_R$;

wherein the $N_k$ is a length of the $k^{th}$ DRX cycle and defined by a time or an interval; and
   wherein the $M_R$ is a number of configured or pre-configured resource pools for the sidelink communication device; $\Delta_k$ and $\Delta_k'$ are mapping offset with regard to activated time and activated resource pool, respectively, in the $k^{th}$ DRX cycle; $0 \leq \Delta_K < N_k$, $0 \leq \Delta_k' < M_R$, k=1, 2, ..., K; K is a number of the DRX cycle, $ID_j$ is the $j^{th}$ destination L2 ID, j=0, 1, ..., J-1, J is the maximum number of the destination L2 ID allowed by the sidelink communication.

2. The method according to claim 1, wherein each of sidelink communication devices possesses a respective destination L2 ID, and any sidelink communication in the sidelink communication devices knows the respective destination L2 ID associated with sidelink communication.

3. The method according to claim 1, wherein the activated time of the $k^{th}$ DRX cycle of said one of the sidelink communication devices depends on the $j^{th}$ destination L2 ID, and, optionally, depends on the mapping offset $\Delta_k$;
   wherein the mapping offset $\Delta_k$ is configured or pre-configured by the high layer, and expressed to be $\Delta_K=\{\Delta_1, \Delta_2, ..., \Delta_K\}$, where $\Delta_k$ values for different DRX cycles capable of being different; and
   wherein, K stands for a number of DRX cycles, $0 \leq \Delta_k < N_k$.

4. The method according to claim 1, wherein the activated resource pool of the $k^{th}$ DRX cycle of said one of the sidelink communication devices depends on the $j^{th}$ destination L2 ID, and, depends on the mapping offset $\Delta_k'$;
   wherein the mapping offset $\Delta_k'$ is configured or pre-configured by the high layer, and expressed to be $\Delta_K'=\{\Delta_1', \Delta_2', ..., \Delta_K'\}$, where $\Delta_k'$ values for different DRX cycles capable of being different; and
   wherein, K stands for a number of DRX cycles, $0 \leq \Delta_k < M_R$.

5. The method according to claim 1, wherein said one of the sidelink communication devices possessing the $j^{th}$ destination L2 ID senses the sidelink communication in the $2Y_{k,j}+1^{th}$ interval of the $k^{th}$ DRX cycle.

6. The method according to claim 1, wherein UE sensing intervals of each groupcast are kept to be constant; and $Y_{k,j}$ is simplified to be $Y_j$.

7. The method according to claim 1, wherein in contiguous slot sensing, a sensing state $S_{k,j}(n)$ of the $j^{th}$ groupcast service in the $n^{th}$ slot of the $k^{th}$ DRX cycle is configured or pre-configured to be $$S_{k,j}(n) = \begin{cases} 1 & \text{if } n_{k,j} - Y_{k,j} \leq n \leq n_{k,j} + Y_{k,j} \\ 0 & \text{else} \end{cases},$$

wherein n=0, 1, ..., $N_k-1$, and $Y_{k,j}$ is a configured or pre-configured parameter of UE sensing intervals in the $j^{th}$ groupcast in the $k^{th}$ DRX cycle.

8. The method according to claim 5, wherein in contiguous slot sensing, a sensing state $S_{k,j}(n)$ of the $j^{th}$ groupcast service in the $n^{th}$ slot of the $k^{th}$ DRX cycle is configured or pre-configured to be $$S_{k,j}(n) = \begin{cases} 1 & \text{if } n_{k,j} - Y_{k,j} \leq n \leq n_{k,j} + Y_{k,j} \\ 0 & \text{else} \end{cases},$$

wherein n=0, 1, ..., $N_k-1$, and $Y_{k,j}$ is a configured or pre-configured parameter of UE sensing intervals in the $j^{th}$ groupcast in the $k^{th}$ DRX cycle.

9. The method according to claim 7, wherein, if $S_{k,j}(n)=1$, then UEs associated with the $j^{th}$ groupcast which is indicated by the $j^{th}$ destination ID are activated to sense in the $n^{th}$ slot in the $k^{th}$ DRX cycle, otherwise the UEs are kept in a sleep mode.

10. The method according to claim 1, wherein in distributed slot sensing, a sensing state $S_{k,j}(n_{k,j})$ of the $N_k$ slot of the $j^{th}$ groupcast service associated with the $n_{k,j}^{th}$ slot in the $k^{th}$ DRX cycle is (pre-) configured to be $$S_{k,j}(n_{k,j})=\{S_{k,j}(0),S_{k,j}(1),\ldots,S_{k,j}(N_k-1),\}.$$

11. The method according to claim 5, wherein in distributed slot sensing, a sensing state $S_{k,j}(n_{k,j})$ of the $N_k$ slot of the $j^{th}$ groupcast service associated with the $n_{k,j}^{th}$ slot in the $k^{th}$ DRX cycle is (pre-)configured to be $$S_{K,j}(n_{k,j})=\{S_{k,j}(0),S_{k,j}(1),\ldots,S_{k,j}(N_k-1),\}.$$

12. The method according to claim 10, wherein, if the $n^{th}$ element $S_{k,j}(n)$ in $S_{k,j}(n_{k,j})$ is equal to 1, then UEs associated with the $j^{th}$ groupcast which is indicated by the destination $j^{th}$ ID are activated to sense in the $n^{th}$ slot in the $k^{th}$ DRX cycle, otherwise the UEs are kept in a sleep mode.

13. The method according to claim 12, wherein a total slot $S_k^U$ is obtained by calculating through a union set of the set $S_{k,j}(n_{k,j})$, that is $$S_k^U = \bigcup_{j=0}^{J-1} S_{k,j}(n_{k,j}).$$

14. The method according to claim 1, wherein the resource pools are defined to be subsets of available slots and frequency resource blocks for sidelink transmission or reception; the resource pools in a time domain are indicated by bit mapping and are repeated at certain intervals; the repetition time intervals of the resource pools are the same as the DRX cycles, or the repetition time intervals of the resource pools and the DRX cycles are integral multiples of each other.

15. The method according to claim 1, wherein a Tx UE associated with the $j^{th}$ group selects resources in the $r_{k,j}^{th}$ resource pool, and transmits packets in the $k^{th}$ DRX cycle; and wherein all Rx UEs associated with the $j^{th}$ group only access the $r_{k,j}^{th}$ resource pool, and sense in all or part of the slots in the $k^{th}$ DRX cycle.

16. The method according to claim 1, wherein:
the $j^{th}$ destination L2 ID, distributed in the DRX cycle of the sidelink communication devices, determines the activated time in the DRX cycle;
the $j^{th}$ destination L2 ID, distributed in the DRX cycle of the sidelink communication devices, determines the activated resource pool in the DRX cycle;
the $j^{th}$ destination L2 ID, distributed in the DRX cycle of the sidelink communication devices, determines the activated sensing window in the DRX cycle; and
the $j^{th}$ destination L2 ID, distributed in the DRX cycle of the sidelink devices, determines any one or any composition of the above method; and wherein:
determining the activated time, the activated resource pool, or the activated sensing window in the $j^{th}$ destination L2 ID is effective for groupcast, broadcast or unicast.

* * * * *